UNITED STATES PATENT OFFICE.

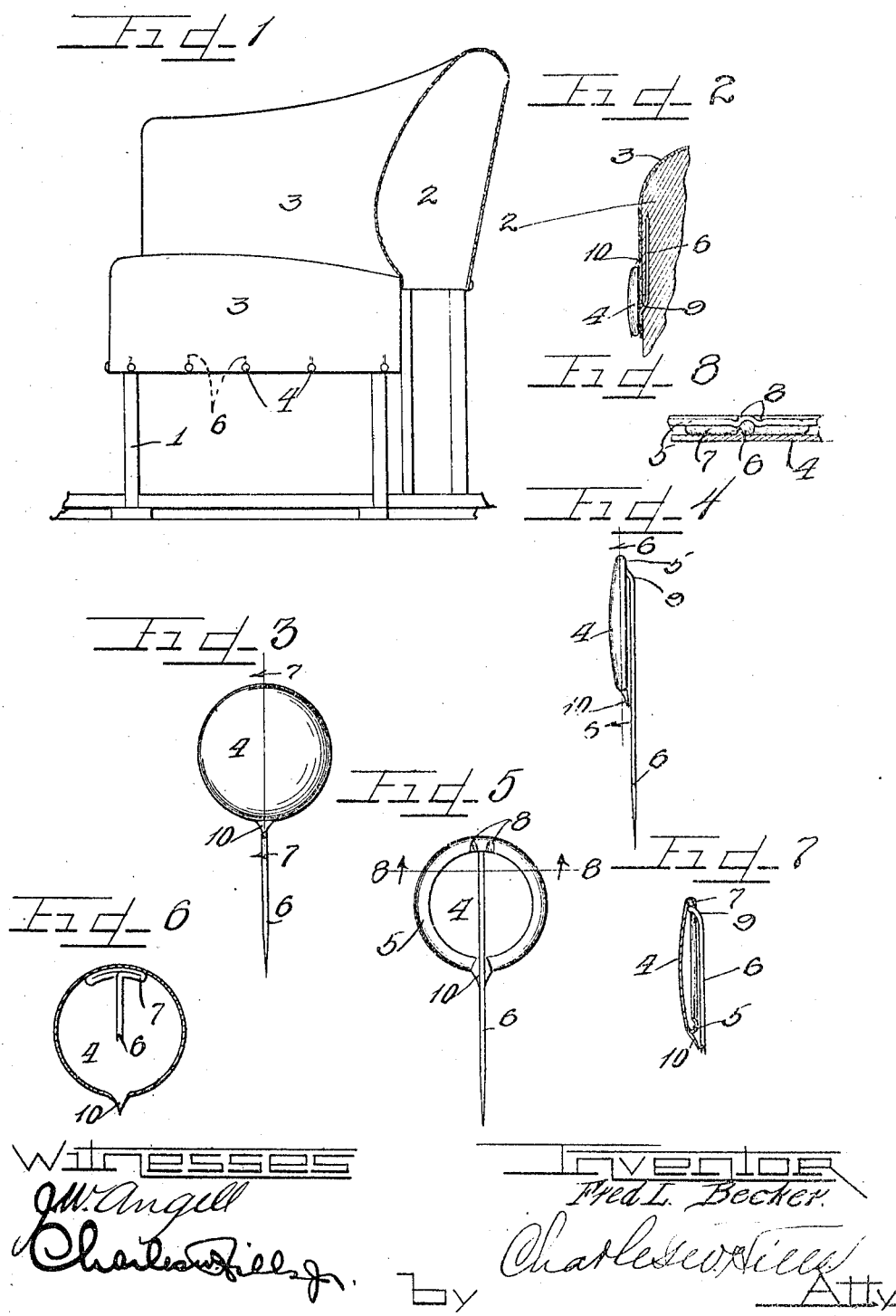

FRED L. BECKER, OF CHICAGO, ILLINOIS.

SEAT-COVER PIN.

1,241,606.  Specification of Letters Patent.  Patented Oct. 2, 1917.

Application filed January 15, 1917. Serial No. 142,376.

*To all whom it may concern:*

Be it known that I, FRED L. BECKER, a citizen of the United States, and a resident of the city of Chicago, in the county of Cook and State of Illinois, have invented certain new and useful Improvements in Seat-Cover Pins; and I do hereby declare that the following is a full, clear, and exact description of the same, reference being had to the accompanying drawings, and to the numerals of reference marked thereon, which form a part of this specification.

In attaching auxiliary seat covers over the cushioned portions of vehicle seats, it has been the practice to first mount a number of screws around the edges of the cushioned portions of the seats with the heads thereof projecting slightly above the cushions to permit snap buttons, secured in registering position on the seat covers to be snapped over said projecting heads to hold the covers removably in position. This arrangement is not only expensive, but requires experience to mount the head screws and snap buttons so that the same shall properly register with one another when it is desired to cover the cushioned portions of the seats of automobiles or other vehicles with auxiliary covers.

This invention relates to an improved type of seat cover pin in which an inwardly rolled flange of a button head engages over the upper supporting end of a comparatively long pin to hold the same rigidly in position in a plane parallel to the plane of the flanged portion of the pin, to permit the pin to be projected through the edge of an auxiliary seat cover and upwardly into the cushioned portion of a seat to securely hold the auxiliary cover in position.

It is an object of this invention to construct a seat cover pin adapted to readily secure an auxiliary cover upon a cushioned seat.

It is also an object of this invention to construct a seat cover pin adapted to be projected through an auxiliary seat covering and into the cushioned portion of a seat to removably but securely hold the auxiliary covering in position.

It is an important object of this invention provide a seat cover pin constructed to permit a covering for a cushioned seat to be removably secured in position over the cushioned portions of the seat by an inexperienced person.

It is furthermore an object of this invention to construct a seat cover pin having an inwardly rolled flanged button head formed to securely hold an offset comparatively long pin in a plane parallel to the plane of the flanged portion of the button head.

It is also an important object of this invention to provide a seat cover pin, simple and inexpensive of construction, and readily adapted to permit the securing of a seat cover over a cushioned seat.

The invention (in a preferred form) is illustrated in the drawings and hereinafter more fully described.

In the drawings:

Figure 1 is an end elevational view of an automobile seat, with parts removed, showing the back in section, and having seat coverings secured thereover by seat cover pins embodying the principles of my invention.

Fig. 2 is a section through a cushioned portion of the seat showing a seat cover pin in position for holding the seat covering removably secured over the seat.

Fig. 3 is a front elevational view of the seat cover pin embodying the principles of my invention.

Fig. 4 is a side view thereof.

Fig. 5 is a rear view thereof.

Fig. 6 is a section taken on line 6—6 of Fig. 4.

Fig. 7 is a section taken on line 7—7 of Fig. 3, with parts shown in elevation.

Fig. 8 is a section taken on line 8—8 of Fig. 5.

As shown in the drawings:

The reference numeral 1, represents as a whole an automobile seat having its cushioned portions 2, covered with auxiliary seat coverings 3, made of mohair or other suitable material, and removably secured upon the cushioned portions 2, by means of seat cover pins embodying the principles of my invention.

The seat cover pin comprises a button head 4, constructed of metal or other suitable material, which is stamped, pressed or formed into a round, convex form, or into any other suitable shape desired, and having integrally formed at the periphery thereof, an inturned flange 5, which lies in a plane below the button top and affords a recess between the same and the button top in the inner periphery thereof, to receive the upper end of an attaching pin 6, which is bent over upon itself to form a curved T-shaped attaching head 7, rigidly held in said recess by the inturned flange 5. To prevent the pin head 7, from slidably moving in said recess, two indents 8, are formed in the flange 5, one on either side of the pin 6, as clearly shown in Figs. 5 and 8. The upper end of the pin 6, directly below the head 7, is bent outwardly and downwardly, as denoted by the reference numeral 9, thus positioning the pin 6, to the rear of and in a plane parallel to the plane of the flange 5, with the pin point extending beyond the edge of the flange 5, opposite the indents 8.

Integrally formed on or rigidly secured to the outer periphery of the flange 5, opposite the indents 8, is a pointed, outwardly directed resilient prong 10, disposed with its point adjacent the middle portion of the pin 6.

The operation is as follows:

When it is desired to cover the cushioned parts 2, of the seat 1, with mohair or other suitable auxiliary seat covers 3, the covers are first stretched over the cushioned seat, sides and back for which they have been made. The seat cover pins are then used to hold the covers in proper position by simply inserting the pins 6, point up, down or in any other direction desired, through the edges of the covering and into the cushioned portions 2, until the bent portions 9, prevent further movement of the pins, as shown in Fig. 2. In this position, the button head 4, of each pin, presses flat against the edge of the covering 3, to hold the same in position. To prevent the button heads 4, from being bent away from the covers 3, about the bent portions 9, the resilient prong 10, on each button head, is forced upwardly into the covering with the upward movement of the seat cover pins.

I am aware that various details of construction may be varied through a wide range without departing from the principles of this invention, and I therefore do not purpose limiting the patent granted otherwise than necessitated by the prior art.

I claim as my invention:

1. In a seat cover pin of the class described, a button head, a flange integrally formed thereon affording a recess between the button head and said flange, an attaching pin disposed in a plane parallel to the plane of said flange, a curved T-shaped head integrally formed on the upper end of said attaching pin bent inwardly and upwardly to fit in said recess below said flange, indents in said flange to prevent sliding movement of said attaching pin in said recess, and a prong formed on said button head at a point opposite said indents to prevent said button head from being bent away from said attaching pin when the seat cover pin is mounted to hold a cover upon a seat.

2. A cover pin comprising a head and flange forming a channel therebetween a pin having its head in said channel, detents struck from the flange to hold the pin therebetween, and a resilient prong struck from the flange to engage in the cover.

3. A seat cover pin comprising a button head, a flange integrally formed thereon affording a recess therebetween, a pin having a flattened T-head thereon curved to conform to the curvature of the button head and secured in the recess, and inwardly directed detents struck from the flange to hold the head and pin associated.

In testimony whereof I have hereunto subscribed my name in the presence of two subscribing witnesses.

FRED L. BECKER.

Witnesses:
CHARLES W. HILLS, Jr.,
EARL M. HARDINE.